Oct. 14, 1952   G. E. STONG   2,613,479
GLASS REHEATING AND RESHAPING
Filed April 21, 1947
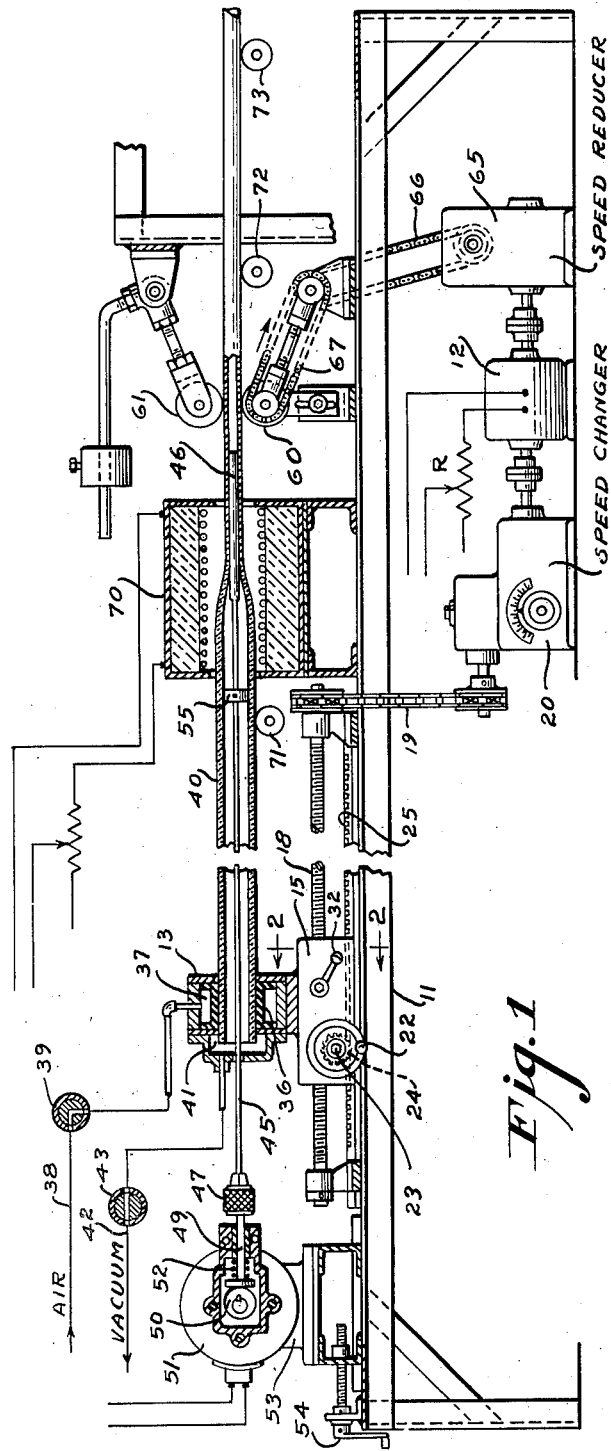
Inventor
GUY E. STONG
By Wright & Fowler
Attorneys Patented Oct. 14, 1952

2,613,479

UNITED STATES PATENT OFFICE 2,613,479

GLASS REHEATING AND RESHAPING

Guy E. Stong, Elmira, N. Y., assignor to Corning Glass Works, Corning, N. Y., a corporation of New York Application April 21, 1947, Serial No. 742,918

6 Claims. (Cl. 49—7)

The present invention relates to the production of linear glass bodies of desired precise shape characteristics and particularly to the production of tubing having an extremely accurate bore.

The prime object of the invention is the production of a linear body of glass having precise cross-sectional dimensional characteristics.

Another object is the economic production of tubular articles of precise internal dimension.

A further object is a method adaptable to the production of tubular articles of either circular or non-circular bore configuration.

These objects are realized in a system which utilizes as the starting material linear glass bodies inexpensively made on high production machines and involves slowly advancing a body of such material into a furnace and drawing the softened glass through a die or over the end of a mandrel of a desired cross-sectional configuration until the body of starting material has been consumed.

In order to assist in a clear understanding of the invention, reference is made to the accompanying drawing, Fig. 1 of which illustrates an apparatus embodying the invention in the process of redrawing tubing to impart to it a desired precise bore diameter.

Fig. 2 is a sectional view taken on line 2—2 of Fig. 1.

Fig. 3 is a sectional view taken on line 3—3 of Fig. 2.

Fig. 4 is a fragmentary view of the apparatus and glass of Fig. 1 as they appear after heating but before the drawing operation has been started.

Referring to the drawing in detail, the apparatus is arranged on a suitable frame 11 having arranged thereon tube feeding and drawing equipment actuated by a motor 12.

The tube feeding equipment comprises a tube chuck 13 attached to a carriage 15 having half-nuts 16 and 17 (Fig. 2) threaded on a screw 18. The carriage 15 is moved from left to right by rotation of screw 18 through the medium of a chain drive 19, a speed changer 20, and the drive motor 12. Return of the carriage 15 to the left end of screw 18 is accomplished by separation of the half-nuts 16 and 17 and returning the carriage by operation of a crank 22 connected to a shaft 23 carrying a pinion 24 in mesh with a rack 25. The half-nuts 16 and 17 are opened and closed about screw 18 by means of pins 26 and 27 projecting therefrom and occupying cam slots 28 and 29 in a plate 30 carried on the end of a shaft 31 passing through the carriage 15 and provided with an operating lever 32 (Figs. 2 and 3).

The tube chuck 13 comprises an enclosed spool of rubber 36 having a surrounding air chamber 37 into which air may be introduced from a line 38 through a valve 39 to force the spool 36 into intimate contact with a glass tube 40. Chuck 13 has an additional chamber 41 to which a vacuum line 42 is connected via a valve 43 to create subatmospheric pressures within the bore of tube 40. Passing through chuck 13 is a mandrel support 45 whose free end carries a former or mandrel 46 and whose opposite end is held by a chuck 47. Chuck 47 is attached to one end of a push rod 49 adapted to be reciprocated jointly by means of a cam 50 rotatable by a motor 51 and by a return spring 52. To initially hold the mandrel 46 at the free end of support 45 centrally disposed within the bore of tube 40, a spacer washer 55 may be arranged on the support. Motor 51 is preferably mounted on a carriage 53 adapted for manual movement by means of a crank 54 to enable changing of the position of mandrel 46 to meet varying operating conditions, as will be brought out later.

The tube drawing equipment may be of the caterpillar tractor or roller type. For the sake of simplicity, a single driven roller 60 is shown as being held in frictional engagement with the tubing 40, after passing over mandrel 46, by means of a roller 61 which of course may also be driven if desired. Roller 60 is driven by motor 12 through the medium of a speed reducer 65 and chain drives 66 and 67. As will be understood, the relative speeds of feeding and drawing can be changed by changing the setting of speed changer 20. On the other hand, the speed of operation may be changed while the relative feed and draw speeds are retained intact by operation of a motor rheostat R.

To suitably heat mandrel 46 and to progressively heat the tube 40 as it is fed to the mandrel, there is preferably provided a suitable electric furnace 70 through which the tubing is passed. Suitable rollers 71—73 for aiding in supporting the tubing may be also provided.

Operation

To start a tube resizing operation, a tube 40 is threaded over mandrel 46 and projected into chuck 13. Valve 39 is then actuated to supply air to chamber 37 to effect seizure of the surrounded end of tube 40. The carriage 15 may be set to initially bring the opposite end of tube 40 to a point intermediate the end of furnace 70 and drawing roller 60 or, alternatively, the carriage may be set to bring the end of the tube between rollers 60 and 61 as illustrated in Fig. 4. Crank 54 is also actuated to draw the mandrel 46 back to the position illustrated in Fig. 4 so as to bring its free end well into the furnace so that it can be rapidly heated to its normal operating temperature.

When the tube 40 reaches softening temperature, as indicated by its sagging condition illustrated in Fig. 4, motor 51 is started, to reciprocate mandrel 46 to reduce the danger of the molten glass sticking to it, and the free end of tube 40 is seized, drawn forward and placed between rollers 60 and 61, if it has not initially been placed between the rollers. The motor 12 is then started to initiate the feed and draw. As will be understood, the rate at which the tube 40 can be fed into furnace 70 depends on its diameter and wall thickness and the heat capacity of furnace 70. The rate of draw is determined by the rate at which tube 40 is softened, and by the amount of glass per unit of length of precision bore tubing to be produced. The proper feed and draw rates are of course attained by appropriate adjustment of rheostat R and speed changer 20 during the early stages of a draw. As soon as drawing begins, the softened portion of the tube 40 is drawn into contact with the mandrel 46 after which valve 43 may be opened to create a subatmospheric pressure in the bore 40 to thus assist the drawing operation in holding the softened glass in intimate contact with the mandrel. This is particularly important if the cross-sectional configuration of the mandrel or former is other than circular to insure accurate reproduction of the mandrel configuration on the bore wall. The next step in the operation is the actuation of crank 54 to advance the mandrel until its free end projects far enough out of the furnace 70 that tubing drawn off the end thereof is sufficiently rigid to maintain desired bore and wall dimensions for a given rate of draw as determined conveniently by applying a tolerance gage to the tube as it issues from the mandrel.

As will be understood, a single tube 40, of say six feet in length, may contain enough glass to produce sixty or seventy or even more feet of precision bore tubing, and this can easily be cracked off in convenient lengths for handling as it passes beyond rollers 60 and 61. Furthermore, the reciprocation of the mandrel to prevent its sticking to the glass places no limitation on its cross-sectional configuration and accordingly flat or other non-circular precision bore tubing can be produced as easily as can circular bore tubing. Preferably, the mandrel is coated from time to time with a lubricant, such as colloidal graphite or the like.

What is claimed is:

1. In an apparatus for progressively reheating and reshaping a linear body of glass, a former, means for progressively heating the body to a workable temperature, means for passingly engaging the glass solely with said former while the glass is at a workable temperature, and means for imparting a linear reciprocating movement to said former relative to the glass along a path paralleling that of the glass as it is being passingly engaged by the body.

2. Apparatus for forming a substantial length of precision bore relatively thin-walled glass tubing from a relatively short length blank of glass tubing, comprising a holder for the rear end of the blank, a tractor for the support of the front end of the blank and for the thin-walled tubing to be drawn, a former, a support for said former passing through said holder, means for reciprocating said support in a plane parallel to the direction of draw, means for heating a localized area of the blank near the end thereof supported by said tractor, and means for actuating said tractor as required to draw thin-walled tubing off the end of said former.

3. In a glass tube reheating and reshaping apparatus, a chuck for receipt of one end of a tube to be reheated and reshaped, a furnace, means for moving said chuck to slowly advance the tube into said furnace to progressively locally heat it along its length, a tractor for gripping the other end of the tube, means for actuating said tractor to draw the tube therethrough at a relatively rapid rate to elongate the tube as it is being drawn, a mandrel occupying the bore of the tube in the area in which it is locally heated, a support for said mandrel, and a reciprocating device to which said support is anchored.

4. The method of making relatively thin-walled tubing of accurate bore from relatively heavy walled tubing, which comprises advancing the heavy walled tubing into a heated atmosphere at a relatively slow rate of speed, drawing the softened portion of the tube into intimate contact with a former, and drawing the glass off the end thereof at a relatively rapid rate while imparting reciprocating movement to the former.

5. In a glass tube reheating and reshaping apparatus, a chuck for receipt of one end of a tube to be reheated and reshaped, a furnace, means for moving said chuck to advance the tube slowly into said furnace to progressively locally heat the tube along its length, a mandrel within the bore of the tube in the area in which it is locally heated, means for reciprocating said mandrel, means for gripping the other end of the tube, and means for actuating said gripping means to move said other end of the tube away from said furnace at a relatively rapid rate to draw said tube onto said mandrel and to elongate the tube as it is being drawn.

6. The method of making relatively thin walled tubing of accurate bore from relatively heavy walled tubing, which comprises drawing the heavy walled tubing into intimate contact with a former while heating said tubing only in the vicinity of the former, and drawing relatively thin walled tubing off the end of said former at a relatively rapid rate while imparting reciprocating movement to said former.

GUY E. STONG.

REFERENCES CITED

The following references are of record in the file of this patent:

UNITED STATES PATENTS

| Number | Name | Date |
|---|---|---|
| 972,166 | De Bay | Oct. 11, 1910 |

FOREIGN PATENTS

| Number | Country | Date |
|---|---|---|
| 339,503 | Germany | July 21, 1921 |
| 547,880 | Great Britain | Sept. 16, 1942 |